July 26, 1960 C. C. BAUM 2,946,893
SCANNER FOR OPTICAL SYSTEMS
Filed Dec. 13, 1950
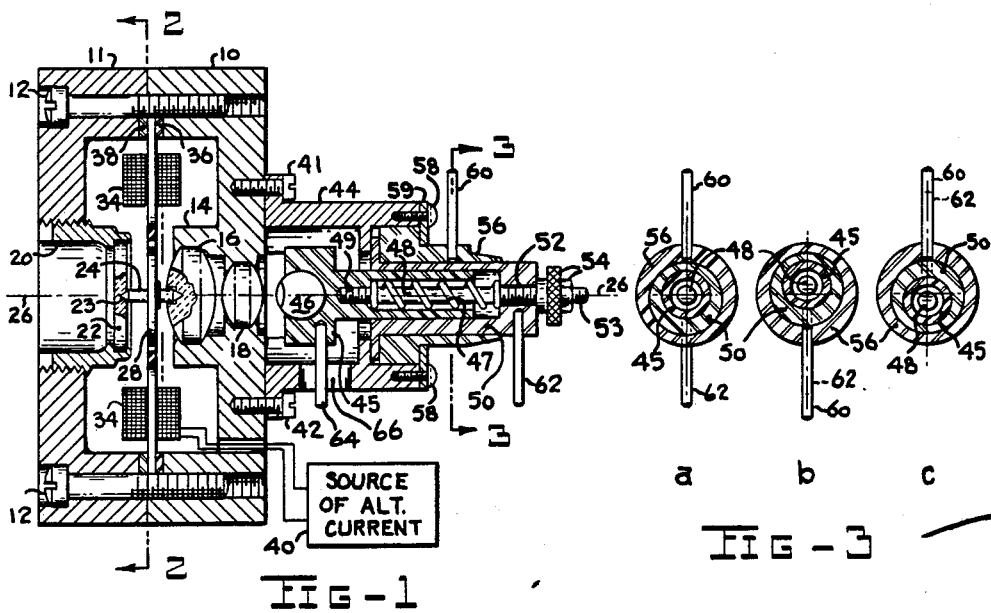
FIG-1
FIG-3
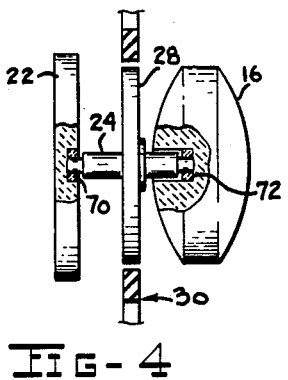
FIG-4
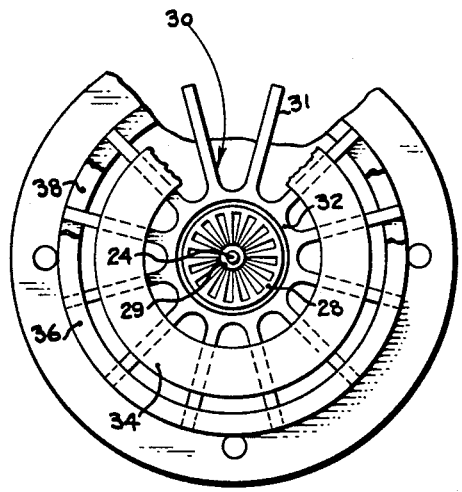
FIG-2
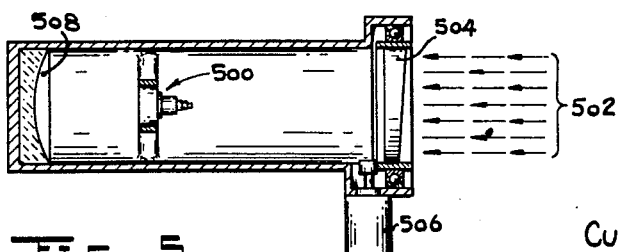
FIG-5
INVENTOR.
CUSTER C. BAUM
BY Nicholas T Vulek
atty.

United States Patent Office 2,946,893
Patented July 26, 1960

2,946,893
SCANNER FOR OPTICAL SYSTEMS

Custer C. Baum, Hawthorne, Calif., assignor, by mesne assignments, to Hughes Aircraft Company, a corporation of Delaware Filed Dec. 13, 1950, Ser. No. 200,613

7 Claims. (Cl. 250—203)

This invention relates to optical systems which require a scanner for converting continuous light flux from a point source into pulses of light.

It is an object of this invention to provide an optical system incorporating a scanner in which the axis of rotation of the scanner is in the optical path of the optical system.

It is an additional object of this invention to provide an optical system including a scanner, this scanner constituting a light interrupting member as well as a rotor of an electric motor.

Still another object of this invention is to provide an optical system in which the axis of the scanning member is in the optical path of the optical system, this scanner also being a rotor of a hysteresis synchronous motor with the bearings of this rotor being mounted within one of the lenses of the optical system.

It is an additional object of this invention to provide an optical and scanning system for a star tracker which is free of vibration and in which the scanner is rotated by means of a rotating magnetic field, thereby eliminating any gear drives, which normally introduce vibration.

The novel features which I believe to be characteristic of the invention, both as to its organization and method of operation, together with further objects and advantages thereof will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a vertical cross-sectional view of the optical system, including a self-contained motor;

Fig. 2 is a plan-view of the scanning member and hysteresis motor taken along line 2—2 of Fig. 1;

Fig. 3 is a cross-sectional view of an eccentric arrangement used for aligning the photo-electric cell with the image of an object observed through the optical system;

Fig. 4 is an enlarged view of an alternative method of mounting the axis of the hysteresis motor in the members of the optical system;

Fig. 5 is a plan-view of a telescope and nutation arrangement used for rotating the image of an observed light-emitting object around the axis of the optical system shown in Fig. 1.

Referring to Fig. 1, the scanner, the condenser lenses, and the photo-electric cell are mounted in a metallic housing including two juxtaposed cups 10 and 11. The cups have two flat matching surfaces along the edges of the two cups and they are held together by a plurality of screws 12. Cups 10 and 11 are made of some paramagnetic material, such as stainless steel. Cup 10 is provided with a cylindrical extension 14 which is used for mounting a condenser lens 16. The center portion of the cup is also provided with a proper seat for the second condenser lens 18. Cup 11 is provided with the centrally located threaded opening which is used for mounting a threaded window frame 20 and a window 22 which could be made of any suitable transparent material such as quartz or some other material transparent to the desired spectrum of radiation. When the wave length of the light to reach the photo-electric cell is in the infra-red portion of the spectrum, window 22 may be made of sapphire which is transparent to the infra-red radiation. The window has optically flat parallel surfaces and therefore does not alter the wave-front of the radiation. This window is also provided with a ground recessed cone 23 which is used for mounting the cone-shaped left end of a shaft 24. As viewed in Fig. 1, the right end of this shaft, which is also provided with the cone-shaped termination, is mounted directly in a ground and polished cone-shaped recess in the condenser lens 16. In the illustrated example the axis of shaft 24 coincides with the optical axis 26 of the entire electro-optical system. The reason for this concentric mounting will become more apparent at the time the description of Fig. 5 is given. A rotor 28, preferably made of magnetic material having high retentivity, is mounted on shaft 24 and is rigidly connected to this shaft. Thus, the optical parts serve as lenses and also as end plates for the motor. Since the central area of the scanning aperture is opaque, the rotor shaft and dual bearings can be mounted in the window and one of the condenser lenses without producing any detrimental effect on normal functioning of the optical system of the disclosed type. The plan-view of this rotor is illustrated in Fig. 2. It consists of a hub 29 mounted concentrically with shaft 24 and an episcotister which consists of a thin disc 28 having a plurality of transparent sectors uniformly distributed around the periphery of the disc. Generally, episcotisters are used for reducing the intensity of illumination intercepted by an optical system on the side beyond the episcotister. It could also be used for producing an amplitude-modulated or a frequency modulated signal for determining the position of a bright object, such as a star, in terms of azimuth and elevation in star tracking systems as disclosed, for example, in the copending applications for patents of Siegfried Hansen, Serial Numbers 58,657; 771,762; 188,401; filed November 6, 1948, September 2, 1947, October 4, 1950, and entitled "Astrometrical Means and Method," "Star Tracking System," and "Electro-Optical Astrometrical System," respectively.

Although the scanner illustrated in Fig. 2 has the configuration of an episcotister, it is to be understood that any other type of scanner may be used for accomplishing the sought result with the type of light-flux modulation desired. For example, an additional type of scanner which is equally suitable for obtaining phase modulated signal with the disclosed electro-optical system, as used in connection with star trackers, is disclosed in the previously mentioned copending application, Serial Number 58,657 in which a scanner is disclosed consisting of a transparent disc with a plurality of opaque sectors on the disc. The only required modification for adapting the type of scanner disclosed in the above application to the system disclosed here would consist of mounting around the disc a metallic band made of magnetic material and having high retentivity. This magnetic band would then resist any change in its magnetic state, and therefore would act as a rotor in the hysteresis motor illustrated in Fig. 1 of the specification.

Whatever is the scanning pattern of disc 28, and whether the scanning portion of the disc is made of some nonmagnetic or magnetic material, it must terminate at its outer periphery with a solid band of magnetic material to act as a rotor of the hysteresis motor of the type described in A.I.E.E. Proceedings, vol. 66, 1947, by Herbert C. Roters, and entitled "Hysteresis Motor Advances Which Permit Economical Fractional Horsepower Ratings." As described in the above article, the rotor must have a smooth outer rim to produce a uniform air-gap between the rotor and the stator of the hysteresis motor. The stator consists of a spider 30 including a plurality of closed-slot magnetic pole pieces 31 which terminate in a continuous magnetic band of magnetic material 32 surrounding the rotor. Although this continuous band acts, in part, as a magnetic shunt between the pole pieces and closes the air gap which normally would exist between the pole pieces 31, it produces a uniform flux distribution along the periphery of the rotor. This, in turn, reduces the spurious hysteresis rotor losses. Moreover, such structure is capable of delivering greater synchronizing torque, and is more efficient than the open slot structure. The pole pieces 31 are provided with field windings 34 which produce a magnetic field around rotor 28 which makes rotor 28 follow it, at the same speed as the angular speed of the field itself. High frequencies, say of the order of 400 cycles per second, may be impressed on the field windings 34 in which case rotational speed of the rotor may be as high as 48,000 revolutions per minute. The pole pieces, and the armature windings mounted on the pole pieces are held by the cups 10 and 11 and magnetic stator rings 36 and 38 provided around the outer periphery of the stator spider 30. Rings 36 and 38 provide a low reluctance path for the flux produced by field winding 34. The field winding 34 is connected to a source of alternating current 40, which may have any desired frequency, as mentioned above, depending upon the angular rotor velocity desired. The photo-electric cell assembly is secured to cup 10 by means of screws 41, 42, etc., these screws and hollow cylindrical members 44 constituting a part of the photo-electric cell housing. The photo-electric cell itself is mounted in a photo-electric cell member 45 provided with a proper recess for accommodating the photo-electric cell 46. Member 45 is provided with a hollow cylindrical extension which is used for accommodating a helical spring 47 and a threaded stud 48 which forms a tight threaded joint 49 with member 45. Member 45 forms a sliding fit with an eccentrically bored elongated cylinder 50 which is provided with an opening 52. The diameter of this opening is such as to form a sliding fit with the threaded portion 53 of stud 48. The stud is provided with a plurality of nuts 54. From the above description it follows that the distance between the photo-electric cell 46 and lens 18 may be adjusted by changing the position of nuts 54 on the threaded portion 53 of stud 48. For optimum signal-to-noise ratio, the light sensitive surface of the photo-electric cell 46 should be positioned at the exit pupil of the optical system. This being the case, it becomes desirable to provide some mechanical arrangements for adjusting the axial position of the photo-electrtic cell 46 with respect to the lenses; stud 48, together with spring 47 and nuts 54, provide this axial adjustment. Since the axis of the bore of cylinder 50 is eccentric to the axis of its external circumference, and since outer rotating member 56 is provided with a bore eccentric to its own external circumference, it follows that, by making those eccentricities equal to each other, rotation of either or both cylinder 50 and member 56 will position the axis of the bore of cylinder 50 any place within a radius equal to the sum of both eccentricities, as clearly illustrated at a, b, c, in Fig. 3. Member 56 is coupled to cylindrical member 44 by means of a plurality of screws 58 and a ring 59. Member 56 forms a rotating joint with the cylindrical member 44, ring 59, and cylindrical member 50 whereby member 45 can be positioned any place around or on the axis 26 of the entire assembly as described above. A lever arm 60 is fastened to the outer rotating member 56, and is used for adjusting angular position of member 56. The same kind of lever arm 62 is attached to the cylindrical member 50 which can be revolved through 360° in member 56. Several angular positions of these members with respect to each other are illustrated at a, b, c, in Fig. 3, examination of which discloses that by rotating the lever arms 60 and 62, it is possible to adjust the position of the photo-electric cell 46 in limited lateral relationship with respect to axis 26. Thus, the disclosed arrangement permits the adjustment of the position of the photo-electric cell 46 along the length of the axis, as well as any plane perpendicular to axis 26. To prevent rotation of member 45 about its own axis, a pin 64 is fixed to member 45 so as to engage a slot 66 provided in cylindrical member 44.

Fig. 4 discloses a modified method of mounting shaft 24 of rotor 28 in lens 16 and transparent plate 22. While in Fig. 1 shaft 24 has cone-shaped terminations, and lens 16 and plate 22 have matching cone-shaped recesses for accommodating the cones of the shaft, in Fig. 4 rotor 28 is mounted in jewel bearings 70 and 72 which are inserted into the proper bearing seats in lens 16 and plate 22.

Fig. 5 illustrates an application of the structure illustrated in Fig. 1 to a star tracking telescope. The electro-optical system of Fig. 1 is illustrated at 500 in Fig. 5. Light flux coming from some distant object passes through a prism 504, which is rotated by a motor 506. The light passing through the rotating prism is intercepted by light-collecting element of the optical system, which may take the form of a concave reflector or mirror 508 which focuses the light beam in the plane of scanner 28. Scanner 28, therefore, acts as the aperture of the optical system of the telescope. The light then is focused on the light-sensitive surface of photo-electric cell 46 by the condenser lenses 16 and 18 where it is converted into a pulsating direct current wave, corresponding in its waveform to the pulsating light flux reaching the condenser lenses 16 and 18. Because of the use of the rotating prism 504, if there is any star or small bright object within the field of view of the telescope illustrated in Fig. 5, its image will be rotated around axis 26 along the circular path concentric with axis 26 in the null position. Any deviation of the star tracker from this position will produce either a frequency modulated signal or a phase modulated signal, depending upon the type of scanner used in the system. The signal is then used for pointing the telescope directly at the star by means of azimuth and elevation servo motors controlled by the output of two electronic channels connected to photo-electric cell 46. For a more detailed description of the entire star tracking systems of the above mentioned type, reference is made to the previously mentioned applications for patents of Siegfried Hansen. While the telescope illustrated in Fig. 5 utilizes a reflecting mirror as a light-collecting and focusing element of the telescope, it is to be understood that the mirror may be eliminated altogether and then the optical system will consist of an objective lens and the condenser lenses illustrated in Fig. 1. In either case, the collected light should be focused in a plane of the scanning disc for the reasons outlined below.

The advantages of the system disclosed in this application reside in the fact that the scanner is free of any vibration, is strictly synchronous, and produces a very compact optical system devoid of any gear trains and any mechanical connections for driving the scanner. This eliminates any possibility of producing mechanical vibrations either in the rotor or the entire electro-optical system. This is an important contribution to the art, since mechanical vibrations in the systems of this type also produce corresponding electrical signals in the photo-electric cell 46, and unless they are eliminated by some filtering arrangements, produce either faulty tracking or lack of any tracking in the star tracking systems described in the previously mentioned applications. Moreover, in the star tracking systems, the amount of power used by the motor should be at a minimum, and elimination of all gear trains and combining of the rotor and scanner into a single unit mounted in jewel bearings enables one to obtain a scanning system which is more reliable in operation and more efficient than the scanning systems known to the prior art.

While the invention has been exemplified in connection with automatic star tracking systems, its teachings are applicable to other applications wherever a substantially constant point-source light-flux must be converted into either pulsating or modulated light flux wave and corresponding pulsating or modulated electrical waves with maximum signal-to-noise ratio and least expenditure of electrical energy for producing the desired scanning. The invention is also equally applicable to any optical system where it is desired to vary the intensity of illumination reaching some device responsive to light-flux. In star-tracking systems it is advantageous to focus the star image on the scanner for obtaining maximum signal-to-noise ratio. This ratio is maximum when the star image is focused on the scanning disc because the scanning disc is then in a position to produce most distinct and abrupt modulation of the star image. Since the sky illumination exceeds that of the star, at least in daytime, many times, hundred percent modulation of the star-image is imperative. This is obtained with the optical systems disclosed in Figs. 1 and 5, in which case the most advantageous position of the scanning disc is at the focal distance of the concave mirror 508. In other applications of the teachings of this invention, where it is desirable to convert the steady-state light flux, into well-defined alternating pulses of light flux, focusing of the light source on the disc is also indicated. However, when general reduction in the intensity of illumination produced by diffused light is all that is desired, the scanner's position along the axis of the optical system is immaterial.

In the disclosed system, the predetermined rotational velocities of the scanner may be as high as 48,000 revolutions per minute. When this is the case, and a vibration-proof system is desired, mounting on jewel bearings of a centrally located shaft is a necessity. However, when the rotational speeds are not especially high and ball-bearings can be tolerated, the scanner may be mounted on a ball-bearing or bearings and the diameter of the bearing made sufficiently large to permit the scanning pattern to occupy the central position with respect to the optical axis. In this case, the episcotister will extend substantially all the way to its center.

What is claimed as new is:

1. An electro-optical system including a telescope having a photo-electric cell, a condenser lens system, an optical collector for focusing light, and a scanning element between said collector and said lens system, said collector focusing the light entering said telescope in the plane of said scanning element and said lens system focusing the light passing through said scanning element on said cell, and means for producing a rotating magnetic field for rotating said scanning element.

2. An optical system comprising a lens, a radiation-transparent window in front of said lens, a rotatable scanning disc between said lens and said window, a shaft supporting said disc, said shaft having two bearings, one of said bearings being mounted within said lens and the other within said window.

3. An optical system as defined in claim 2 in which said scanning disc has a ferro-magnetic band around its periphery, field windings surrounding said band, and a source of alternating current connected to said field windings for producing a rotating magnetic field to rotate said disc in accordance with the rotation of said field.

4. A telescope comprising a hollow cylindrical tube, a rotating prism at one end of said tube, a concave mirror at the other end of said tube, and an electro-optical system in light intercepting relationship with respect to said concave mirror, said electro-optical system including a scanner, a condenser lens system, and a photo-electric cell, said concave mirror focusing the image in the plane of said scanner, and means for producing electromagnetic field around the periphery of said scanner following said field.

5. A telescope as defined in claim 4 in which said optical system includes a radiation transparent window between said concave mirror and said condenser lens system, a shaft for said scanner, said shaft being supported on one side by said window and on the other side by said condenser lens system.

6. A telescope as defined in claim 4 which also includes means for adjusting the position of said photo-electric cell in three dimensions with respect to the axis of said optical system whereby the position of light-sensitive surface of said photo-electric cell may be placed at the exit pupil of said condenser lens system.

7. An optical system comprising: a condenser lens; a rotatable scanner positioned axially adjacent one surface of said lens; means, electromagnetically coupled to said scanner, for producing a magnetic field rotating at a predetermined frequency to rotate said scanner at said predetermined frequency; and a radiation sensitive device positioned axially adjacent to the other surface of said lens, whereby radiant flux incident on said scanner is converted into pulsating radiant flux by the rotation of said scanner, said lens focusing said pulsating radiation sensitive device.

References Cited in the file of this patent

UNITED STATES PATENTS

| | | | |
|---|---|---|---|
| 688,458 | Caldwell | | Dec. 10, 1900 |
| 2,237,960 | Hensen | | Apr. 8, 1941 |
| 2,369,622 | Toulon | | Feb. 13, 1945 |
| 2,525,147 | Nelson | | Oct. 10, 1950 |